United States Patent
Prasad et al.

(10) Patent No.: US 7,680,067 B2
(45) Date of Patent: Mar. 16, 2010

(54) PEER-TO-PEER DATA SYNCHRONIZATION ARCHITECTURE

(75) Inventors: Srikiran Prasad, Santa Clara, CA (US); Rik Sagar, Santa Clara, CA (US); Frank Judge, Haverhill, MA (US); Gurmeet Singh Kalra, Newark, CA (US)

(73) Assignee: Palm, Inc., Sunnyvale, CA (US)

( * ) Notice: Subject to any disclaimer, the term of this patent is extended or adjusted under 35 U.S.C. 154(b) by 384 days.

(21) Appl. No.: 11/684,551

(22) Filed: Mar. 9, 2007

(65) Prior Publication Data
US 2008/0222212 A1    Sep. 11, 2008

(51) Int. Cl.
H04W 4/00 (2006.01)
H04B 7/216 (2006.01)
G06F 12/00 (2006.01)
G06F 17/30 (2006.01)

(52) U.S. Cl. .................. 370/254; 370/338; 370/342; 707/201; 709/248

(58) Field of Classification Search ......... 370/338–342, 370/400, 254–278, 311–330; 707/200–201; 709/248–252; 455/502–509, 517–522
See application file for complete search history.

(56) References Cited

U.S. PATENT DOCUMENTS

| | | | |
|---|---|---|---|
| 7,336,638 B2 * | 2/2008 | Cheng et al. | 370/338 |
| 7,522,639 B1 * | 4/2009 | Katz | 370/503 |
| 2007/0067349 A1 * | 3/2007 | Jhaveri et al. | 707/200 |
| 2007/0230679 A1 * | 10/2007 | Altberg et al. | 379/218.01 |
| 2007/0276836 A1 * | 11/2007 | Chatterjee et al. | 707/10 |
| 2007/0291714 A1 * | 12/2007 | Laroia et al. | 370/338 |
| 2008/0002635 A1 * | 1/2008 | Mosko et al. | 370/338 |
| 2009/0010231 A1 * | 1/2009 | Laroia et al. | 370/338 |
| 2009/0010232 A1 * | 1/2009 | Laroia et al. | 370/338 |
| 2009/0172201 A1 * | 7/2009 | Carmel | 709/248 |

* cited by examiner

Primary Examiner—Man Phan
(74) Attorney, Agent, or Firm—Fenwick & West LLP

(57) ABSTRACT

To enable the peer-to-peer synchronization among multiple devices, each device in the peer network keeps track of the changes it makes to any shared data and also keeps track of its own knowledge of the changes made by other devices. When two or more peer devices communicate, they share with each other their information about any changes made to the shared data by them or by other devices. This allows the devices to synchronize with each other to the extent that each of the devices knows what changes have been made by it or by other devices in the peer network.

42 Claims, 8 Drawing Sheets

250

| CHANGE NUMBER 310 | OBJECT ID 320 |
|---|---|
| 0 | O_ID_1 |
| 1 | O_ID_2 |
| 2 | O_ID_3 |
| ⋮ | |

| DEVICE ID 410 | CHANGE NUMBER 310 |
|---|---|
| Device_A | 0 |
| Device_B | 3 |
| ⋮ | |

FIG. 4

PEER-TO-PEER DATA SYNCHRONIZATION ARCHITECTURE

BACKGROUND

The present invention relates to data synchronization, and more specifically, to synchronizing data between or among multiple devices in a peer-to-peer environment.

Handheld devices and portable computers are becoming increasingly more powerful and functional devices. Many handheld devices are now multifunction devices with multiple device roles including: personal digital assistant (PDA), cellular phone, portable media player, voice recorder, video recorder, global positioning system (GPS), camera, and electronic file storage. Similarly, portable computers now have increased functionality and mobility. Because of these improvements in handheld devices and portable computers, data is commonly shared among multiple handheld devices and portable computers, with multiple devices accessing and modifying shared data files.

Additionally, advances in wireless Internet coverage and in wireless network capabilities made a broad range of data (such as electronic files, image files, audio files and video files) accessible to mobile communication devices, laptop computers, and other types of portable communication systems. Network improvements have also allowed electronic data to be accessed and modified from virtually any location. This combination of improved wireless network access and improved portable device functionality has caused users increasingly to access and modify electronic data from multiple, often widely separated, locations using multiple different portable devices.

Because multiple devices can access and modify the same data, the different data modifications should be synchronized to ensure the each device accesses the most recent version of the data. For example, a user may use one portable device to edit an electronic document in one location, and later use a different portable device to access the same electronic document from a different location. Synchronization ensures that the electronic document accessed by the second portable device includes the modifications made using the first portable device. Synchronization is also used where a multiple users can access and modify the same data from multiple devices in various locations, requiring the data to be synchronized among the multiple devices.

Existing methods for data synchronization require the data modifications to be transmitted to a central server. The central server then transmits the modifications to other devices. To synchronize data, the devices must remain connected to the centralized server. When the centralized server is unavailable, modifications to data stored on each device cannot be transmitted to other devices. Thus, data cannot be synchronized between multiple devices when the server is unavailable.

Therefore, there is a need for a method to synchronizing data between or among peer devices without requiring a centralized server to update the data.

SUMMARY

Various embodiments of the invention allow data to be synchronized between or among multiple devices in a peer-to-peer environment, without the need for a centralized system that keeps track of the shared data. To enable the peer-to-peer synchronization, each device in the peer network keeps track of the changes it makes to any shared data files and also keeps track of its own knowledge of the changes made by other devices. When two or more peer devices are able to communicate, they share with each other their information about any changes made by them or by other devices to the data. In this way, devices in a peer network can achieve synchronization, and changes made on one peer device can be propagated onto other peer devices without requiring direct communication between the devices.

In one embodiment, when a change is made with respect to a shared data file on a particular device, the device logs the change according to a change identifier. The change identifier may include a unique identifier associated with the change, a unique identifier associated with the changed data, and a unique identifier associated with the device that made the change. Additionally, the change identifier may include a priority level for the change, which is used for conflict resolution by the devices. The change identifiers may be stored on each device in a change log. Because the change identifiers track the changes that have been made to the shared data files on each device, they allow the peer devices to maintain synchronization without the need for a central system that keeps track of the shared data files.

Upon a communication between two or more peer devices in the peer network, the peer devices share their knowledge about the changes made to the shared data. In one embodiment, to synchronize the shared data upon establishment of a data connection between two peer devices, each device sends to the other its most recent change according to the device table. In response, the other device determines what change identifiers to send back, and then sends those. After receiving the changes from the other device, each device then stores the changes, updates its own device table, and then implements the changes that it determines are necessary. In one embodiment, the devices implement a policy or algorithm to resolve any conflicts in the changes.

BRIEF DESCRIPTION OF THE DRAWINGS

The disclosed embodiments have other advantages and features, which will be more readily apparent from the following detailed description and the appended claims, when taken in conjunction with the accompanying drawings, in which:

FIG. 3 is an example of a table associating changes with a device, according to one embodiment of the invention.

FIG. 4 is an example of a log recording the changes made on a device, according to one embodiment of the invention.

DETAILED DESCRIPTION

Embodiments of the invention allow shared data stored on multiple devices to be synchronized between or among the devices. When the shared data are modified on one device, for example, a change identifier is generated that describes the data modifications, the device modifying the data, and the number of modifications to the data. The change identifier is transmitted to one or more other devices, which can use the change identifier to update their locally stored data according to the modifications described by the change identifier and thereby synchronize the shared data that was modified on one device. Rather than transmitting the changes to a central server, each device transmits a change identifier directly to other devices, which can use the change identifier to locally reproduce the described changes. Because the change identifiers are transmitted from device to device, fewer resources are necessary to synchronize shared data stored on multiple devices.

System Architecture

Figure 1:
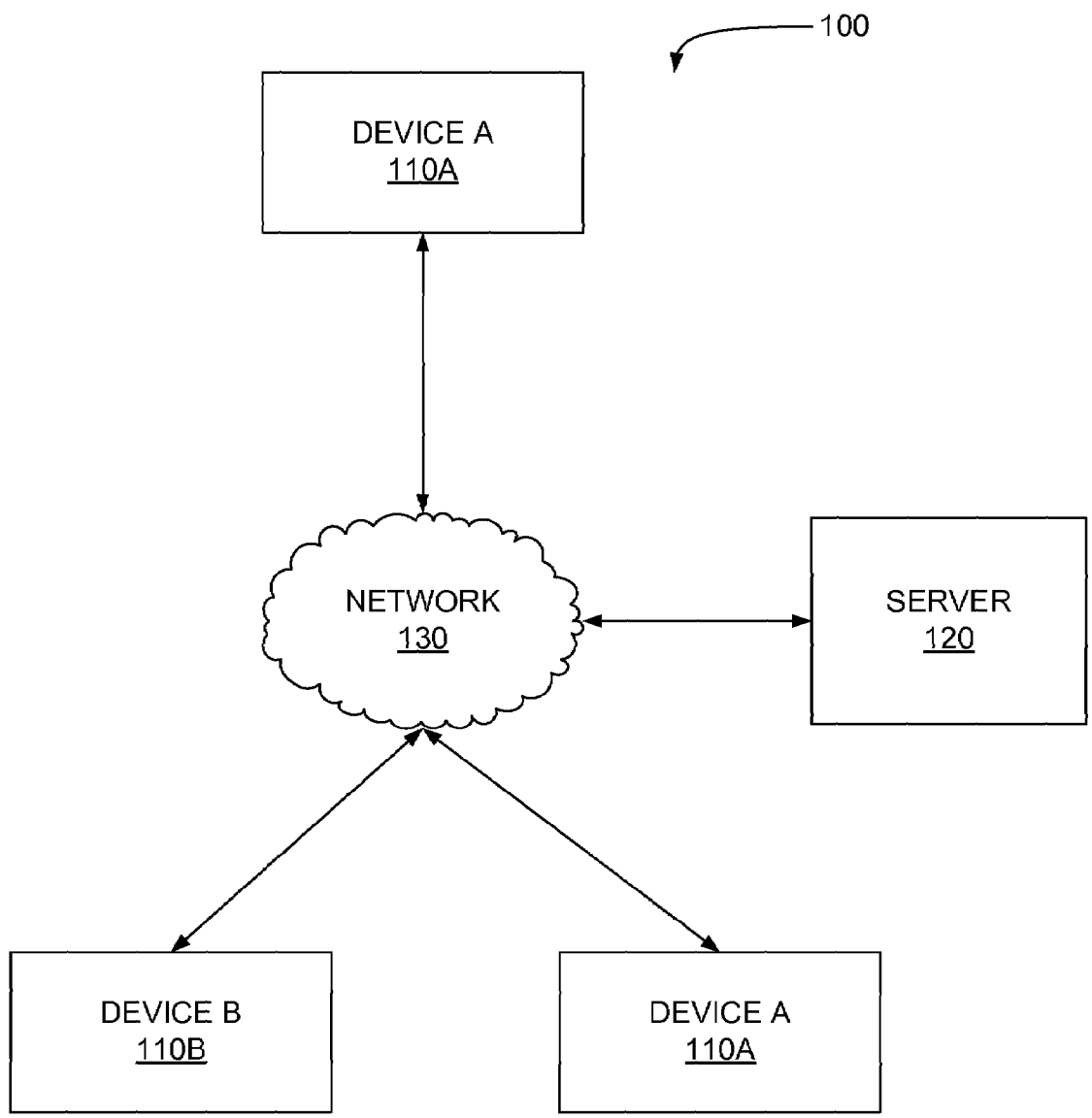
FIG. 1 is a block diagram of an architecture of the system, according to one embodiment of the invention.

FIG. 1 illustrates one embodiment of a system 100 for synchronizing data between devices. For purposes of illustration, FIG. 1 shows the system 100 comprising three devices: device A 110A, device B 110B, and device C 110C; however, the system 100 may include any number of devices. Device A 110A, device B 110B, and device C 110C are remote from each other in the sense that they are not integrated with each other, but each device may be physically located anywhere with respect to the other devices (e.g., in the same room in a house and communicating over a Bluetooth connection, or across the world and communicating via the Internet). In an embodiment, the system 100 further comprises a network 130 and a remote server 120. Network 130 allows device A 110A, device B 110B and device C 110C to communicate with each other. Alternatively, device A 110A, device B 110B and device C 110C may directly communicate with each other. In one embodiment, the system 100 further comprises a remote server 120 used to allow device A 110A, device B 110B and device C110C to locate each other.

Devices A 110A, device B 110B and device C 110C may each include computing capabilities and data communication capabilities. For example, device A 110, device B 110B and device C 110C may each be a tablet computer, a laptop computer, a portable digital assistant (PDA), a smartphone, or any device able to transmit and receive data and perform actions on data. In one embodiment, one or more of device A 110, device B 110B and device C 110C comprises a desktop computer with data communication capabilities. In another embodiment, one or more of device A 110A, device B 110B and device C 110C comprises a mobile communication device that is structured to fit, and be controlled from, the the palm of a hand while providing computing capabilities with wireless communication capabilities. Further embodiments of device A 110A, device B 110B and device C 110C are described in more detail below.

Further, device A 110A, device B110B and device C 110C each include data storage capabilities for storing data shared between each other. The shared item of data may comprise one or more data files, such as electronic documents, graphical images, audio files, video files, e-mails, and/or any other electronic representations of information. When data are shared, each of device A 110, device B 110B and/or device C 110C using the shared data stores local copies of the shared data. Because the shared data are stored on multiple devices, the shared data stored on device A 110A, device B 110B and device C 110C need to be synchronized so each device has a current version of the shared data.

The remote server 120 contains information that can be used to identify and access device A 110A, device B 110B and device C 110C and other devices connected to a network 130, such as Internet protocol (IP) addresses, or similar network addresses. In an embodiment, the remote server 120 stores this identification information, and device A 110A, device B 110B and device C 110C access the remote server 120 to determine the identification information of each other. This allows device A 110A, device B110B and device C 110C to find additional devices using the remote server. Alternatively, device A110A, device B 110B and device C 110C may locally store and maintain information capable of identifying each other and enabling direct communication and data access between or among the devices in a peer-to-peer configuration.

In an embodiment, the network 130 is used to transmit information between device A 110A, device B 110B and device C 110C. In one embodiment, the network 130 enables device A 110A, device B 110B, device C110C and the remote server 120 to communicate with each other. The network 130 may comprise a conventional wireless data communication system, for example, general packet radio service (GPRS), IEEE 802.11 (or WiFi), IEEE 802.16 (or WiMax), Bluetooth, or any other suitable wireless communication system. Alternatively, the network 130 may comprise a conventional wired data communication system, such as Ethernet, digital subscriber line (DSL), integrated services digital network (ISDN), or any other suitable wired communication system.

Figure 2:
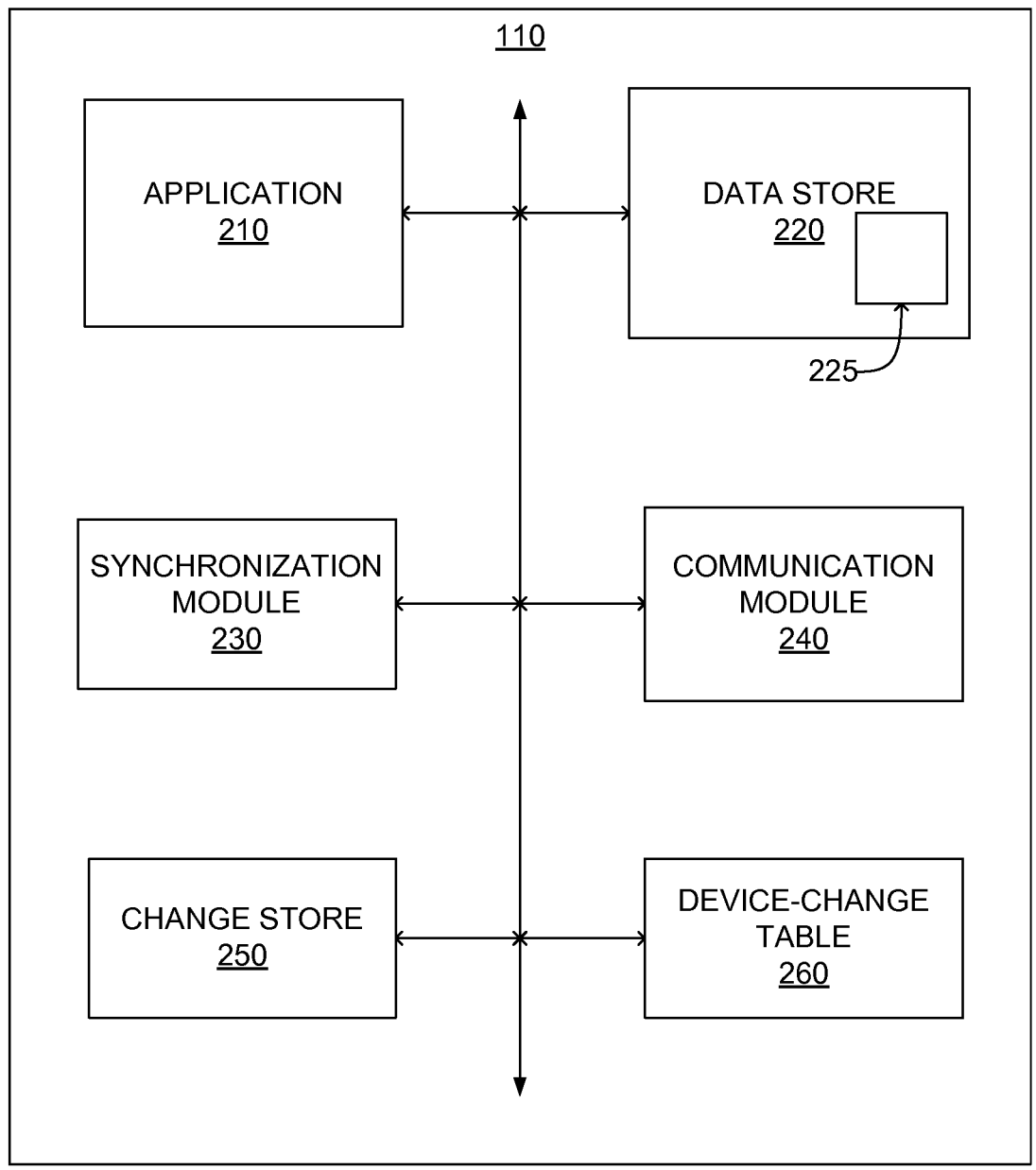
FIG. 2 is a high-level block diagram of a device, according to one embodiment of the invention.

FIG. 2 is a block diagram illustrating components of a device 110, such as device A 110A, according to an embodiment. Other devices, such as device B 110B and device C 110C may be implemented with the same or a similar structure. Those of skill in the art will recognize that other embodiments can include different and/or additional features and/or components than the ones described here.

Device A 110A comprises an application 210, a data store 230, a synchronization module 230, a communication module 240, a change store 250 and a device-change table 260. The application 210 allows a user to access and modify a data file on the device 110. Local device 110 may also include a visual display device, such as a liquid crystal display or cathode ray tube display, allowing the application 210 to present information to the user. Further, local device 110 may include an input device, such as a keyboard, a digitizer pad, a "touch" sensitive display (e.g., pressure-sensitive (resistive), electrically-sensitive (capacitance), acoustically-sensitive (SAW, or surface acoustic wave), or photo-sensitive (infra-red)) that allows the application 210 to receive input from the user.

The application 210 allows a user to access and modify data files that are stored in the data store 220. Alternatively, the application 210 may use and modify data files without any direct user input. The application 210 may present information to the user and receive input from a user. Alternatively, the application 210 may generate metadata, for storage or transmission, describing the contents of the data store 220 accessed or modified by a user. Typically, the device 110 will contain a number of different applications 210 that each perform different functions (such as word processors, email clients, and various types of computer software for viewing and manipulating media), but for simplicity, an embodiment with a single application 210 is described herein.

The data store 220 stores data for use by the local device 110. The stored data can be received from the remote device 115 or the remote server 120, or the stored data can be locally generated by a user of device 110. The data store 220 can be a hard disk drive, a flash memory device, or some other suitable mass storage device. Further, the data store 220 can be a volatile storage device, a non-volatile storage device, or a combination of a nonvolatile storage device and a volatile storage device.

The data store 220 may include shared data item 225 corresponding to data stored on device A 110A and another device, such as device B 110B or device C 110C. Each device 110 using the shared item 225 stores a local copy of the shared item 225. The shared item 225 may comprise textual data, graphical data, video data, audio data, multimedia content, or any other information capable of being represented electronically. When a user modifies the modifies the shared item 225 on device A 110A, the copies of the shared item 225 stored on device B 110 B and device C 110C need to be modified accordingly so each device accesses the same version of the shared item 225.

The synchronization module 230 enables the copies of the shared item 225 stored on device A 110A, device B 110B and/or device C110C to be synchronized. The synchronization module 230 receives information describing changes to the shared item 225 by the device A 110A or device B 110B or device C 110C. Additionally, the synchronization module is used to generate information describing changes to the shared item 225 made by device A 110A, or a user of device A 110A. In an embodiment, the synchronization module 230 applies a hash function to the shared item 225 to generate a value describing the contents of the shared file 225. The synchronization module 230 also can extract the contents of the shared file 225 from received data. For example, the synchronization module 230 applies an inverse hash function to a received data to determine the data associated with the received value.

In response to receiving a change description, the synchronization module 230 determines whether or not to modify the local copy of the shared item 225. In an embodiment, the synchronization module 230 applies locally-stored conflict resolution rules to determine how to modify the shared item 225. Alternatively, the synchronization module 230 may receive conflict resolution rules from another source and use the received rules to determine how to modify the shared item 225. In an embodiment, the synchronization module 230 may be a software module configured to run on a general purpose processor in the device 110. Alternatively, the synchronization module 230 may be implemented using a field-programmable gate array (FPGA), an application-specific integrated circuit (ASIC), or other suitable data-processing device.

The change store 250 stores the changes made to the shared item 225. The changes may be made by a user of device A 110A or by user of device B 110B or device C 110C and received by the communication module 240 of device A 110A. The change store 250 can be a hard disk drive, a flash memory device, or some other suitable mass storage device. Further, the change store 250 can be a volatile storage device, a non-volatile storage device, or a combination of a nonvolatile storage device and a volatile storage device. In an embodiment, the change store 250 comprises a portion of the data store 220 configured to store data corresponding to modifications of the shared file 225. Alternatively, the change store 250 may comprise a separate storage device. An example structure of the change store 250 is further described below in conjunction with FIG. 3.

The device-change table 260 stores information associating changes to the shared item 225 with the device making the changes. For example, if a user of device B 110B modifies the shared item 225, the device-change table 260 stores data associating the specified change with device B 110B. In an embodiment, the device-change 260 database comprises a portion of the data store 220 configured to store data associating shared item 225 changes with the device 110A, 110B, 110C making the changes. Alternatively, the device-change table 260 may comprise a portion of the change store 250 configured to associate changes to the shared item 225 with the devices 110, 110B, 110C making the change. In yet another embodiment, the device-change 260 database comprises a separate storage device. An example configuration of the device-change table 260 is further described below in conjunction with FIG. 4.

The communication module 240 enables device A 110A to communicate with network 130, device B 110B, device C 110C and/or remote servers 120. In an embodiment, the communication module 240 comprises a transceiver such as for infrared communication, Bluetooth communication, 3 G communication, radio frequency communication, or any other wireless communication technique. In an alternative embodiment, the communication module 240 comprises a conventional wired connection, such as Ethernet, USB, etc. or other wired communication technique. Alternatively, the communication module 240 comprises both a wired connection and a transceiver. The communication module 240 allows data files and/or information to be distributed using network protocols, such as Transmission Control Protocol (TCP), Internet Protocol (IP), Hypertext Transmission Protocol (HTTP), or other protocols capable of communicating data or information.

FIG. 3 is an example implementation of a change store 250 recording changes to a shared item 225, according to one embodiment of the invention. In the example of FIG. 3, for purposes of illustration, the change store 250 is depicted as including a change number 310 and a change identifier 320. In other embodiments, different and/or additional information may be included in the change store 250.

The change number 310 comprises data describing the order in which changes are made to the shared item 225. For example, the change number 310 may comprise a numeric counter that is incremented each time the shared item 225 is modified, so that the most recent changes correspond to higher values of the numeric counter. However, the change number 310 may use any format capable of identifying the order in which modification are made to the shared file 225.

The object identifier 320 uniquely identifies the modification of the shared item 225. While the change number 310 determines the sequence in which the shared file 225 is changed, the object description 320 describes the changed shared item 225 and the changes to the shared item 225. In an embodiment, the object identifier 320 comprises the result of a hash function applied to the contents of the shared item 225. As the contents of the shared file 225 are modified, the result of the hash function changes, so that the hash function describes the changed shared item 225. When the object identifier 320 is produced using a hash function, the same hash function may be used by device A 110A, device B 110B and device C 110C to simplify determination of the shared file 225 modification. Alternatively, the object identifier 320 may comprise the shared item 225, metadata describing the changes and the shared item 225, instructions describing how to change a locally stored copy of the shared item 225, or any other data capable of describing the shared item and associated changes.

FIG. 4 is an example of a device-change table 260 associating changes with devices, such as device A 110A, device B 110B and device C 110C, according to one embodiment of the invention. In the example of FIG. 4, the device-change table 260 is shown as including a device identifier 410 and a change number 310. In other embodiments, different and/or additional information may be included in the device-change table 260.

The device identifier 410 indicates which device, such as device A 110A device B 110B or device C 110C changes the shared item 225. In one embodiment, the device identifier 410 comprises an alpha-numeric value uniquely identifying each device A 110A, device B 110B and device C 110C. For example, device A 110A, device b 110B and device C 110C may each be assigned a unique alphanumeric string identifier. Alternatively, the device identifier 410 may comprise a network address or a serial number for each of device A 110A, device B 110B and device C 110C. The above descriptions are merely examples and the device identifier 410 may comprise any data that uniquely identifies each device.

The device-change table 260 associates each change number 310 with a device identifier 410, indicating which of device A 110A, device B 110B or device C 110C made each change to the shared item 225. In one embodiment, the device-change table 260 also includes the change description 360. In an embodiment, the device-change table 260 and the change log 250 may be combined into a single storage system associating a change number 310 with a device identifier 410 and an object identifier 360.

As a shared item 225 may be changed in different ways, for example by being created or added, by being modified or by being deleted, data stored by device A 110A allows device B 110B and device C 110C to determine how to change the shared item 225. The combination of object identifier 360 and change number 310 allows other device B 110B and device C 110C to determine the necessary changes, and the order in which to make the changes so the locally stored copies of the shared item 225 are synchronized with device A 110A.

System Operation

Figure 5:
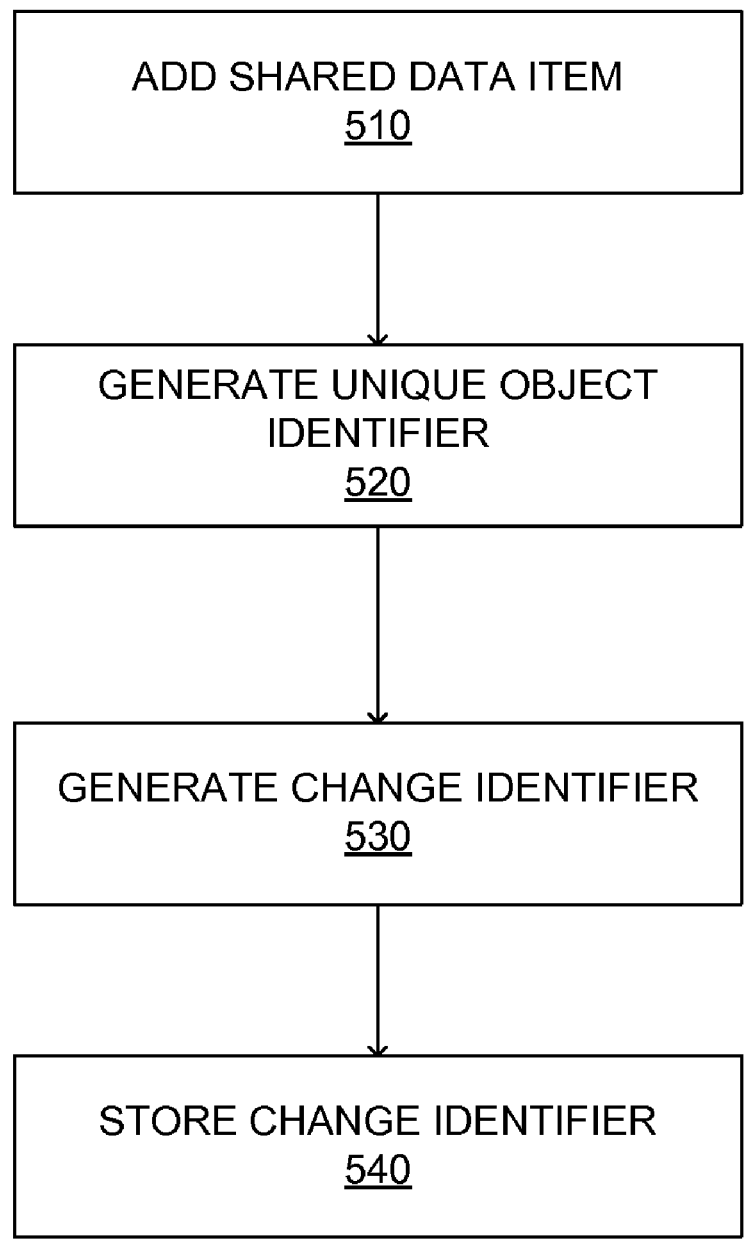
FIG. 5 is a flowchart of adding data to local device, according to one embodiment of the invention.

FIG. 5 is a flowchart of adding a shared data item 225 to a device, such as device A 110A, according to one embodiment of the invention. Those of skill in the art will recognize that other embodiments can perform the steps of FIG. 5 in different orders. Moreover, other embodiments can include different and/or additional steps than the ones described here.

Initially, a shared data item 225, or other shared data, is added 510 to the data store 220 on device A 110A. In an embodiment, a user may create a new shared data item 225. Alternatively, a user may indicate that an existing data item is to be shared between or among multiple device A 110A, device B 110B and device C 110C, for example, moving a data item into a shared folder or setting a field or flag associated with the data item. In yet another embodiment, the shared data item 225 is added 510 responsive to software running on device A 110A, such as an automatically generated log file. An object identifier is then generated 520 on device A 110A.

The object identifier 320 uniquely identifies the shared item 225. In an embodiment, the object identifier 320 describes the contents of the shared item 225. For example, the synchronization module 230 applies a hash function to the added 510 shared item 225 to produce an object identifier 320 describing the contents of the shared item 225. However, the object identifier 320 may comprise any information capable of uniquely describing the contents and/or identity of the shared item 225. Device B 110B and/or device C 110C can then use the object identifier 320 to identify the added 510 shared item 225 and create a local copy of the shared item 225.

The generated 520 object identifier 320 is then used to generate 530 a change identifier identifying the changes made to the shared item 225; thus, the change identifier indicates that the data identified by the object identifier 320 is now shared between or among device A 110A, device B 110B and/or device C 110C. In an embodiment, the change identifier is generated 520 by associating the object identifier 320 with a device identifier 410 indicating which of device A 110A, device B 110B or device C 110C added 510 the shared data item 225. In an embodiment, the change identifier further associates the object identifier 320 with a change number 310 describing the order in which the shared item 320 is changed. This object identifier 320 and change number 310 pair is then stored 540 in the change log 250. The device identifier 410 and associated change number 310 is then stored 540 in the device-change table 260. Alternatively, the object identifier 320, device identifier 410 and change number 310 are stored 540 together in the change log 250, or other suitable storage location.

Figure 6:
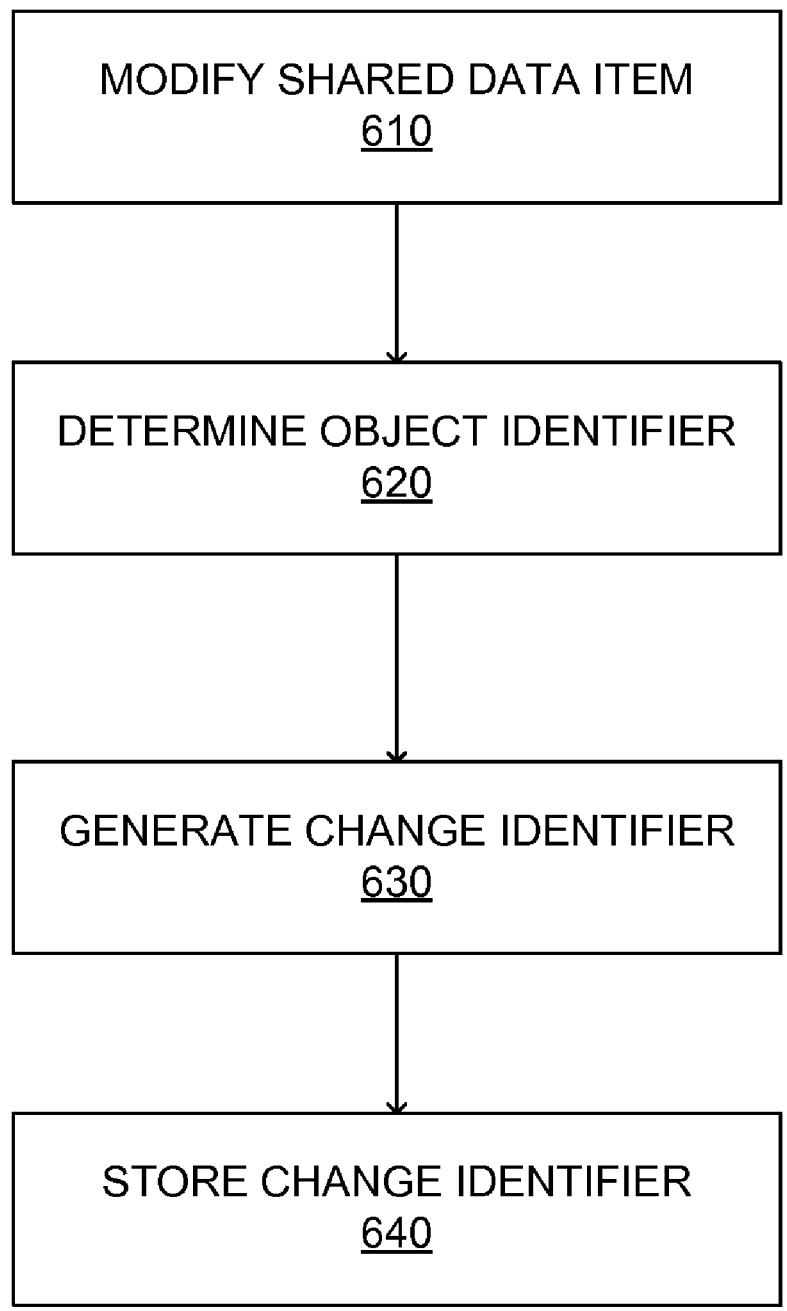
FIG. 6 is a flowchart of modifying data stored on a device, according to one embodiment of the invention.

FIG. 6 is a flowchart of modifying a shared data item 225 stored on a device, such as device A 110A according to one embodiment of the invention. Those of skill in the art will recognize that other embodiments can perform the steps of FIG. 6 in different orders. Moreover, other embodiments can include different and/or additional steps than the ones described here.

Initially, the shared item 225 is modified 610 on a device 110A. In an embodiment, the data modification 610 is responsive to user actions. Alternatively, the modification 610 may be responsive to actions performed by software running on the local device 110. Examples of data modification 610 include rotating an image, resizing an image, cropping an image, editing an electronic document, and a variety of other actions altering characteristics or contents of the shared item 225. An object identifier 320 identifying the modified 610 shared item 225 is then determined 620. When the shared item 225 already exists, the existing object identifier 320 is used to identify the shared item 225. In an embodiment, determining 620 the object identifier 320 comprises applying a hash function to the shared item 225, which creates a new object identifier 320 as the contents of the shared item 225 change.

The change identifier indicating the modifications is then generated 630 and associated with the determined 620 object identifier 320. Hence, the change identifier describes the modifications to the shared item 225, such as that the data identified by the object identifier 320 is shared between or among devices 110A, 110B, 110C. In an embodiment, the change identifier associates the generated 620 object identifier 320 with a device identifier 410 identifying the device 110A, 110B, 110C making the modification. Alternatively, the change identifier further associates a change number 310 with the object identifier 320. The object identifier 320 and change number 310 pair is then stored 640 in the change log 250. The device identifier 410 associated with the change number 310 is then stored 640 in the device-change table 260. In another embodiment, generating 630 the change identifier comprises associating the object identifier 320 with a corresponding change number 310 and a device identifier 410 and storing 640 this group of data in the change log 250, or other storage location.

Figure 7:
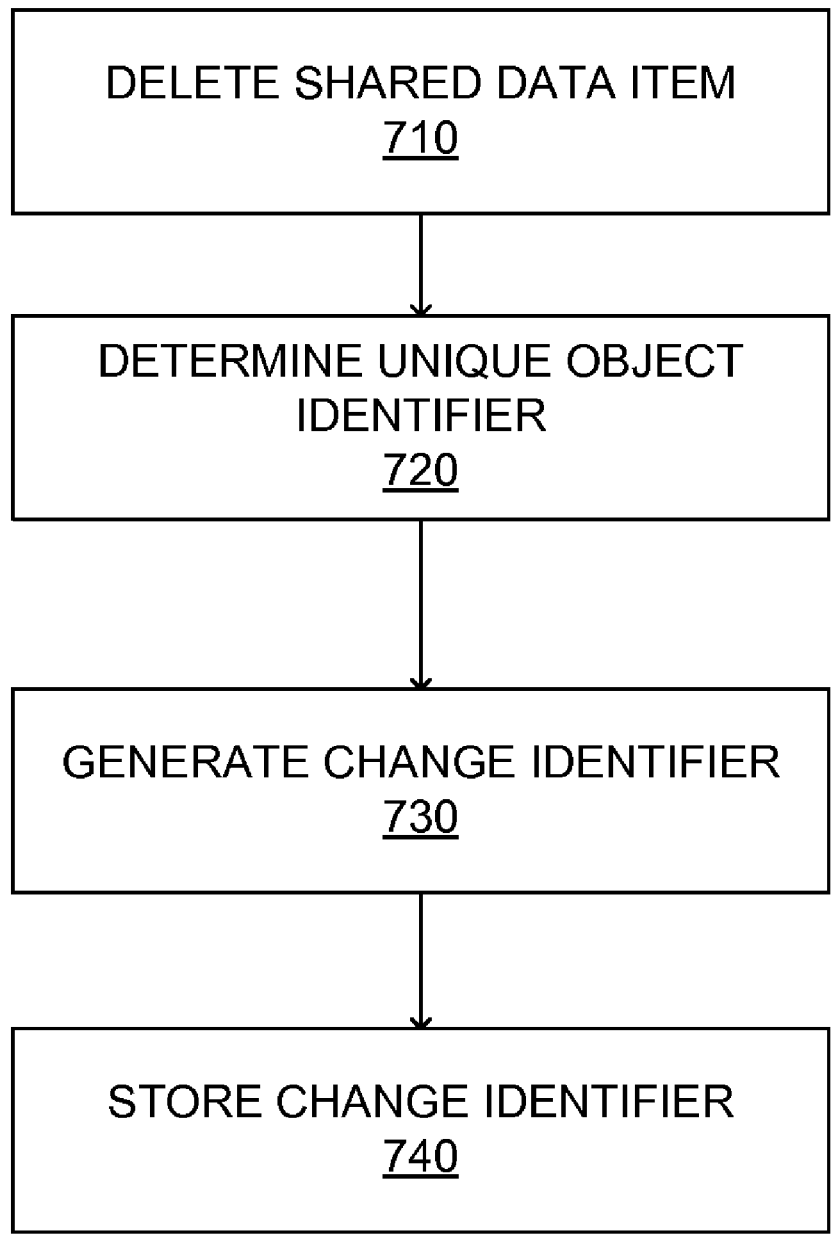
FIG. 7 is a flowchart of deleting data stored on a device, according to one embodiment of the invention.

FIG. 7 is a flowchart of deleting a shared data file 225 stored on a device 110A, 110B, 110C according to one embodiment of the invention. Those of skill in the art will recognize that other embodiments can perform the steps of FIG. 7 in different orders. Moreover, other embodiments can include different and/or additional steps than the ones described here.

Initially, a shared data item 225 is deleted 710. In one embodiment, deleting 710 the shared item 225 comprises removing the shared item 225 from the data store 220. The removal may be temporary, such as moving the shared item 225 to a removable storage device or to a portion of data store 230 that is not shared or erasing the shared item 225, or permanent. Alternatively, deleting 710 the shared item 225 comprises indicating the shared item 225 is no longer shared between or among devices 110B, 110C. An object identifier 320 uniquely identifying the deleted 710 shared item 225 is then generated 720. When the shared item 225 already exists, the existing object identifier 320 is used to identify the shared item 225. In an embodiment, determining 720 the object identifier 320 comprises applying a hash function to the shared item 225, creating a new object identifier 320 based on the contents of the shared item 225 change.

The generated 720 object identifier 320 is then used to generate 730 a change identifier identifying the shared item 225 and indicating that the shared item 225 has been deleted 710. Thus, the change identifier indicates that the local copies of the shared item 225 identified by the object identifier 320 stored on device B 110B and/or device C 110C are to be deleted to synchronize shared item 225. In an embodiment, the change identifier is generated 730 by associating the generated 720 object identifier 320 with a device number 410 identifying which device, such as device A 110A, device B 110B or device C 110C deleted 710 a local copy of the shared item 225. This object identifier 320 and device identifier 410 pair is then stored 740 in the device-change table 260. Alternatively, a corresponding change number 310 is associated with the object identifier 320 and the object identifier 320— change number 310 pair is stored 740 in the change table 250. Alternatively, generating 730 the change identifier comprises associating the object identifier 320 with a corresponding change number 310 and a device identifier 410. This group of data is then stored 740 in the change log 250, or other storage location.

Although the shared item 225 is deleted 710, the generated 730 change identifier is stored 740. This allows other device B 110B and/or device C 110C to synchronize data with device A 110A by using the change identifier to identify the shared item 225 deleted 710 by device A 110A. For example, a laptop user may delete 710 an electronic document that is also shared with the user's mobile communication device and desktop computer. The change identifier identifying the electronic document remains stored 740 in the laptop after the electronic document is deleted 710. When the mobile communication device and desktop computer connect with the laptop computer, each device uses the stored 740 change identifier identify the electronic document and to delete copies of the electronic document stored on the mobile communication device and desktop computer, thus synchronizing the shared data between the laptop computer, desktop computer and mobile communication device.

Figure 8:
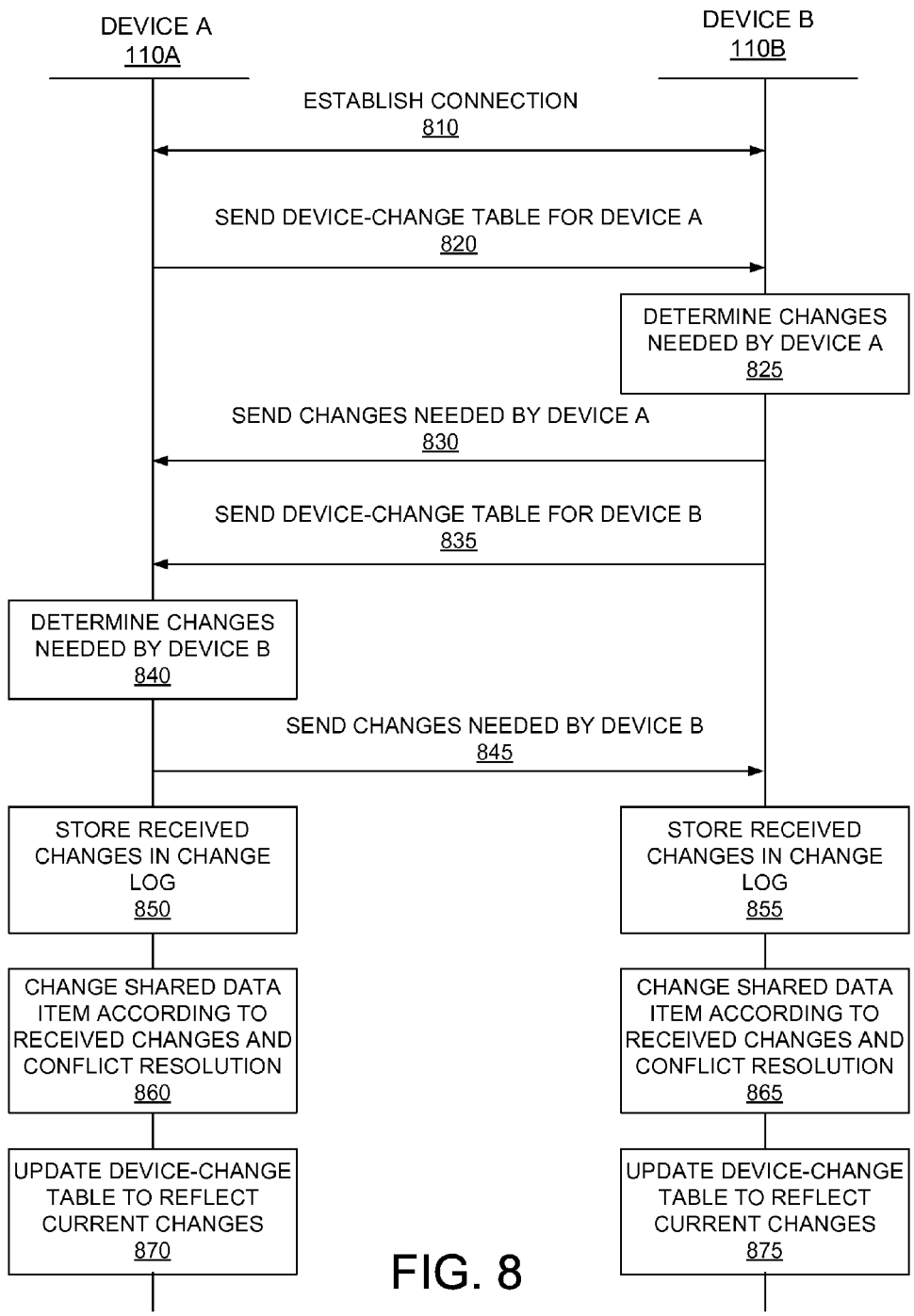
FIG. 8 is a trace diagram illustrating data synchronization between two devices, according to one embodiment of the invention.

FIG. 8 is a trace diagram illustrating data synchronization between device A 110A and device B 110B, according to one embodiment of the invention. Those of skill in the art will recognize that other embodiments can perform the steps of FIG. 8 in different orders. Moreover, other embodiments can include different and/or additional steps than the ones described here. For purposes of illustration, FIG. 8 shows data synchronization between device A 110A and device B 110B, but data may be synchronized between any number of devices.

Initially, device A 110A and device B 110B establish 810 a connection with each other. The connection may be established using a wireless connection (e.g. Bluetooth, 802.11a/b/g, or other suitable wireless connection) or a wired connection (e.g. Ethernet, USB, Firewire, or other suitable wired connection). Either device A 110A or device B 110B may establish 810 the connection so long as device A 110A and device B 110B can communicate with each other.

After establishing 810 the connection, device A 110A sends 820 the change identifiers describing the most recent changes to the shared item 225 to device B 110B. In an embodiment, device A 110A sends 820 the change numbers from the device-change table 260 to device B 110B. This provides device B 110B with the current status of the shared item 225 on device A 110A. By sending the contents of the device-change table 260, device A 110A transmits a listing of the changes made to the shared item 225 made by device A 110A, regardless of whether the change originated at device A 110A or another device.

After receiving the change numbers or change identifiers, device B 110B determines 825 the changes needed by device A 110A. In determining 825 the necessary changes, device B 110B examines its local change store 250 to determine 825 if there are any stored changes more recent than those received from device A 110A. As a result of the determination 825, device B 110B sends 830 the appropriate changes to device A 110A. The changes sent 830 to device A 110A can originate with any device, provided device B 110B has stored information about the changes in its device-change table 260. In an embodiment, device B 110B sends 830 the locally stored changes that are more recent than change numbers received from device A 110A. Although described above with regard to time of changes, the determination 825 and sending 830 can be based on different criteria, such as changes made by a particular device, changes with a specified priority level, or any other suitable characteristic of the change.

Device B 110B then sends 835 the change identifiers describing the most recent changes to the shared item 225 to device A 110A. In an embodiment, device B 110B sends 835 the change numbers from the device-change table 260 to device A 110 to describe the most recent changes to the shared item 225 known to device B 110B, including changes made by other devices and communicated to device B 110B. After receiving the change numbers or change identifiers, device A 110A determines 840 the changes needed by device B 110B. In determining 840 the necessary changes, device A 110A examines its local change store 250 to determine 840 if there are any stored changes more recent than those received from device B 110B. As a result of the determination 840, device A 110A sends 845 the appropriate changes to device B 110B. The changes sent 830 to device B 110B can originate with any device, provided device A 110A has stored information about the changes in its device-change table 260. In an embodiment, device B 110B sends 830 the locally stored changes that are more recent than change numbers received from device A 110A. Although described above with regard to time of changes, multiple criteria can be used for the determination 840 and sending 845, such as changes made by a particular device, changes with a specified priority level, or any other suitable characteristic of the change.

Device A 110A then locally stores 850 the received change identifiers in a local change table 250. This allows the change table 250 of device A110A 110B to contain most most recent changes to shared data item 225, even if the most recent changes were initially communicated to device B 110B but not to device A 110A.

After storing 850 the change identifier received from device B 110B, device A 110 changes 860 the shared data item 225 corresponding to the received change identifiers. During changing 860, device A 110A determines whether or not the changes described by the received change identifier should be made to the locally-stored shared item 225. For example, device A 110A may apply a predetermined set of conflict resolution rules to the received change identifier to determine the order in which to apply the received changes to the local copy of the shared item 225. Various conflict resolution schemes may be implemented, such as recording timestamps of changes made, assigning priority to changes from certain devices, or any other suitable conflict resolution scheme. Alternatively, the change identifier may include information indicating the priority of the described change or other information indicating how the changes should be made to the shared item 225.

After changing 860 the local copy of the shared item 225, device A 110A updates 870 the local device-change table 260 to reflect the current changes. As the device-change table 260 maintains a record of what device initiated the changes to the shared item 225, it is updated to reflect the changes sent 830 by device B 110B. This updating 870 enables the device-change table 260 to indicate changes to the shared item 225 recently made by device A 110A, which allows other devices accessing device A 110A to determine which changes have been most recently made.

Similarly, device B 110B locally stores 855 the change numbers or identifiers received from device A 110A so its local change table 250 contains the most recent changes to the shared item 225. Device B 110B then changes 865 the local copy of the shared item 225 according to the received change numbers or identifiers. During changing 865, device B 110B determines whether or not the changes described by the received change identifier should be made to the locally-stored shared item 225 by applying a predetermined set of conflict resolution rules (e.g. examining the timestamps of the received changes, the device making the change, examining a priority level included in the change identifier, etc.) to the received change identifier. In an embodiment, the conflict resolution rules determine the order in which the received changes are applied to the local copy of the shared item.

After changing 865 the local copy of the shared item 225, device B 110B updates 875 the local device-change table 260 to reflect the changes sent 845 by device A 110A. This updating 875 allows other devices accessing device B 110B to ascertain the most recent changes to the shared item 225.

Thus, device A 110A and device B 110B exchange change numbers or change identifiers indicating the current changes to the shared item 225 on both devices 110A, 110B. Each device 110A, 110B then determines whether the other device 110B, 110A needs to receive more recent change numbers or change identifiers and sends the more recent change numbers or change identifiers to the other device. Each device 110A, 110B then stores the received change identifiers or numbers, determines whether or not to change the data responsive to the received change identifiers or change numbers and updates the local device-change table 260 to reflect the implemented changes

SUMMARY

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system or similar electronic computing device, which manipulates and transforms data represented as physical (electronic) quantities within the computer system memories or registers or other such information storage, transmission, or display devices.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memory (ROM), random access memory (RAM), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and it may not have been selected to delineate or circumscribe the inventive subject matter. Accordingly, the disclosure of the embodiments of the invention is intended to be illustrative, but not limiting, of the scope of the invention, which is set forth in the following claims.

What is claimed is:

1. A method for synchronizing data between or among multiple devices in a peer network, the method comprising:
   making a change to a shared data item on a local device;
   tracking the change to the shared data item;
   tracking additional changes to the shared data item made by other devices in the peer network;
   establishing communication with a remote device in the peer network;
   transmitting data describing changes to the shared data item made by the local device or other devices in the peer network;

receiving data from the remote device describing changes to the shared data item by the remote device or other devices in the peer network;

changing the shared data item according to the received data from the remote device; and updating the additional changes to the shared data item made by other devices in the peer network.

2. The method of claim 1, wherein tracking the change to the shared data item comprises:

logging a change identifier on the local device, the change identifier uniquely identifying the change, the data item changed and the device making the change.

3. The method of claim 1, wherein tracking changes to the shared data item made by other devices in the peer network comprises:

maintaining a device-change table on the local device, the device-change table associating a change with the device making the change.

4. The method of claim 2, wherein transmitting data describing changes to the shared data item made by the local device or other devices in the peer network comprises:

transmitting a most recent change identifier.

5. The method of claim 4, further comprising:

transmitting a most recent change associated with each device from the device-change table.

6. The method of claim 3, wherein receiving data from the remote device describing changes to the shared data item by the remote device or other devices in the peer network further comprises:

generating an identifier associating the received data describing changes to the shared data item with the remote device; and storing the identifier in the device-change table.

7. The method of claim 1, wherein changing the shared data item according to the received data from the remote device comprises an action selected from a group consisting of: adding the shared data item, modifying the shared data item and deleting the changed data item.

8. The method of claim 1, wherein changing the shared data item according to the received data from the remote device comprises:

applying a conflict resolution scheme to the received data; and changing the shared data item in response to the conflict resolution scheme determining the received data describes a change that should be implemented.

9. The method of claim 1, wherein updating the additional changes to the shared data item made by other devices in the peer network comprises: updating a device-change table on the local device, the device-change table associating an additional change with the device making the change, to reflect the changes described by the received data.

10. The method of claim 2, wherein the change identifier further comprises a priority level.

11. The method of claim 2, wherein the change identifier further comprises a timestamp indicating the time of the change to the shared item.

12. The method of claim 1, wherein receiving data from the remote device describing changes to the shared data item by the remote device or other devices in the peer network comprises:

receiving, from the remote device, data describing changes to the shared data item the remote device has tracked, wherein the changes to the shared data item are made by the remote device or other devices in the peer network;

determining additional changes to the shared data item tracked by the local device and not described by the data received from the remote device; and transmitting data to the remote device describing the additional changes tracked by the local device and not described by the data received from the remote device.

13. A method for synchronizing data between or among multiple devices in a peer network, the method comprising:

making a change to a shared data item on a local device;

tracking the change to the shared data item;

tracking additional changes to the shared data item made by other devices in the peer network;

establishing communication with a remote device in the peer network;

receiving, from the remote device, data describing changes to the shared data item the remote device has tracked, wherein the changes to the shared data item are made by the remote device or other devices in the peer network;

determining local changes to the shared data item tracked by the local device and not described by the data received from the remote device; and transmitting data to the remote device describing the additional changes tracked by the local device and not described by the data received from the remote device.

14. The method of claim 13, wherein tracking the change to the shared data item comprises:

logging a change identifier on the local device, the change identifier uniquely identifying the change, the data item changed and the device making the change.

15. The method of claim 13, wherein tracking additional changes to the shared data item made by other devices in the peer network comprises:

maintaining a device-change table on the local device, the device-change table associating a change with the device making the change.

16. The method of claim 14, wherein, receiving, from the remote device, data describing changes to the shared data item the remote device has tracked, wherein the changes to the shared data item are made by the remote device or other devices in the peer network comprises:

transmitting a most recent change identifier from the remote device.

17. The method of claim 15, receiving, from the remote device, data describing changes to the shared data item the remote device has tracked, wherein the changes to the shared data item are made by the remote device or other devices in the peer network comprises:

generating an identifier associating the received data describing changes to the shared data item with the remote device; and storing the identifier in the device-change table.

18. The method of claim 14, wherein transmitting data to the remote device describing the additional changes tracked by the local device and not described by the data received from the remote device comprises:

transmitting the changed shared item to the remote device; and transmitting a change identifier identifying the change to the shared item.

19. The method of claim 13, wherein receiving, from the remote device, data describing changes to the shared data item the remote device has tracked, wherein the changes to the shared data item are made by the remote device or other devices in the peer network comprises:

changing the shared data item according to the received data from the remote device; and updating the changes to the shared data item made by other devices in the peer network.

20. A computer program product for synchronizing data between or among multiple devices, the computer program product comprising a computer-readable medium containing computer program code for:
- making a change to a shared data item on a local device;
- tracking the change to the shared data item;
- tracking additional changes to the shared data item made by other devices in the peer network;
- establishing communication with a remote device in the peer network;
- transmitting data describing changes to the shared data item made by the local device or other devices in the peer network;
- receiving data from the remote device describing changes to the shared data item by the remote device or other devices in the peer network;
- changing the shared data item according to the received data from the remote device; and
- updating the additional changes to the shared data item made by other devices in the peer network.

21. The computer program product of claim 20, wherein tracking the change to the shared data item comprises:
- logging a change identifier on the local device, the change identifier uniquely identifying the change, the data item changed and the device making the change.

22. The computer program product of claim 20, wherein tracking additional changes to the shared data item made by other devices in the peer network comprises:
- maintaining a device-change table on the local device, the device-change table associating a change with the device making an additional change.

23. The computer program product of claim 21, wherein transmitting data describing changes to the shared data item made by the local device or other devices in the peer network comprises:
- transmitting a most recent change identifier.

24. The computer program product of claim 23, further comprising computer program code for:
- transmitting a most recent change associated with each device from the device-change table.

25. The computer program product of claim 22, wherein receiving data from the remote device describing changes to the shared data item by the remote device or other devices in the peer network further comprises:
- generating an identifier associating the received data describing changes to the shared data item with the remote device; and
- storing the identifier in the device-change table.

26. The computer program product of claim 20, wherein changing the shared data item according to the received data from the remote device comprises an action selected from a group consisting of: adding the shared data item, modifying the shared data item and deleting the changed data item.

27. The computer program product of claim 20, wherein changing the shared data item according to the received data from the remote device comprises:
- applying a conflict resolution scheme to the received data; and
- changing the shared data item in response to the conflict resolution scheme determining the received data describes a change that should be implemented.

28. The computer program product of claim 20, wherein updating the changes to the shared data item made by other devices in the peer network comprises:
- updating a device-change table on the local device, the device-change table associating a change with the device making the change, to reflect the changes described by the received data.

29. The computer program product of claim 21, wherein the change identifier further comprises a priority level.

30. The computer program product of claim 21, wherein the change identifier further comprises a timestamp indicating the time of the change to the shared item.

31. The computer program product of claim 20, wherein receiving data from the remote device describing changes to the shared data item by the remote device or other devices in the peer network comprises:
- receiving, from the remote device, data describing changes to the shared data item the remote device has tracked, wherein the changes to the shared data item are made by the remote device or other devices in the peer network;
- determining changes to the shared data item tracked by the local device and not described by the data received from the remote device; and
- transmitting data to the remote device describing the changes tracked by the local device and not described by the data received from the remote device.

32. A communication network for synchronizing data between or among multiple devices, the system comprising:
- a plurality of devices each running the computer program product of claim 20.

33. The communication network of claim 32, wherein a device comprises:
- a transceiver for receiving data or metadata and for transmitting data or metadata;
- a user input device for receiving a change to a data stored on the device.

34. A computer program product for synchronizing data between or among multiple devices, the computer program product comprising a computer-readable medium containing computer program code for:
- making a change to a shared data item on a local device;
- tracking the change to the shared data item;
- tracking additional changes to the shared data item made by other devices in the peer network;
- establishing communication with a remote device in the peer network;
- receiving, from the remote device, data describing changes to the shared data item the remote device has tracked, wherein the changes to the shared data item are made by the remote device or other devices in the peer network;
- determining changes to the shared data item tracked by the local device and not described by the data received from the remote device; and
- transmitting data to the remote device describing the additional changes tracked by the local device and not described by the data received from the remote device.

35. The computer program product of claim 34, wherein tracking the change to the shared data item comprises:
- logging a change identifier on the local device, the change identifier uniquely identifying the change, the data item changed and the device making the change.

36. The computer program product of claim 34, wherein tracking additional changes to the shared data item made by other devices in the peer network comprises:
- maintaining a device-change table on the local device, the device-change table associating a change with the device making an additional change.

37. The computer program product of claim 35, wherein, receiving, from the remote device, data describing changes to the shared data item the remote device has tracked, wherein the changes to the shared data item are made by the remote device or other devices in the peer network comprises:

transmitting a most recent change identifier from the remote device.

38. The computer program product of claim 34, receiving, from the remote device, data describing changes to the shared data item the remote device has tracked, wherein the changes to the shared data item are made by the remote device or other devices in the peer network comprises:

generating an identifier associating the received data describing changes to the shared data item with the remote device; and storing the identifier in the device-change table.

39. The computer program product of claim 35, wherein transmitting data to the remote device describing the additional changes tracked by the local device and not described by the data received from the remote device comprises:

transmitting the changed shared item to the remote device; and transmitting a change identifier identifying the change to the shared item.

40. The computer program product of claim 34, wherein receiving, from the remote device, data describing changes to the shared data item the remote device has tracked, wherein the changes to the shared data item are made by the remote device or other devices in the peer network comprises:

changing the shared data item according to the received data from the remote device; and updating the changes to the shared data item made by other devices in the peer network.

41. A communication network for synchronizing data between or among multiple devices, the system comprising:

a plurality of devices each running the computer program product of claim 34.

42. The communication network of claim 41, wherein a device comprises:

a transceiver for receiving data or metadata and for transmitting data or metadata;

a user input device for receiving a change to a data stored on the device.

* * * * *

UNITED STATES PATENT AND TRADEMARK OFFICE
CERTIFICATE OF CORRECTION

PATENT NO. : 7,680,067 B2  Page 1 of 1
APPLICATION NO. : 11/684551
DATED : March 16, 2010
INVENTOR(S) : Srikiran Prasad et al.

It is certified that error appears in the above-identified patent and that said Letters Patent is hereby corrected as shown below:

Column 16, line 33, Claim 33, after "on the device" add "and a processor running the computer program product of claim 20"; and Column 18, line 19, Claim 42, after "on the device" add "and a processor running the computer program product of claim 34".

Signed and Sealed this

Twelfth Day of October, 2010

David J. Kappos
*Director of the United States Patent and Trademark Office*